United States Patent
Kanzawa

(10) Patent No.: US 11,238,292 B2
(45) Date of Patent: Feb. 1, 2022

(54) SYSTEMS AND METHODS FOR DETERMINING THE DIRECTION OF AN OBJECT IN AN IMAGE

(71) Applicant: Toyota Research Institute, Inc., Los Altos, CA (US)

(72) Inventor: Yusuke Kanzawa, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 59 days.

(21) Appl. No.: 16/696,308

(22) Filed: Nov. 26, 2019

(65) Prior Publication Data

US 2021/0158059 A1    May 27, 2021

(51) Int. Cl.
| | |
|---|---|
| *G06K 9/62* | (2006.01) |
| *G06N 3/08* | (2006.01) |
| *G06K 9/00* | (2006.01) |
| *G06N 20/00* | (2019.01) |

(52) U.S. Cl.
CPC ..... *G06K 9/00805* (2013.01); *G06K 9/00201* (2013.01); *G06K 9/6256* (2013.01); *G06N 3/08* (2013.01); *G06N 20/00* (2019.01); *G06T 2207/20081* (2013.01)

(58) Field of Classification Search
CPC combination set(s) only.
See application file for complete search history.

(56) References Cited

U.S. PATENT DOCUMENTS

| | | | |
|---|---|---|---|
| 9,091,628 B2 | 7/2015 | Sezen et al. | |
| 2007/0274566 A1* | 11/2007 | Fujimoto | G06K 9/00798 |
| | | | 382/103 |
| 2008/0294401 A1 | 11/2008 | Tsin et al. | |
| 2010/0284607 A1 | 11/2010 | Van Den Hengel et al. | |
| 2011/0052042 A1 | 3/2011 | Ben Tzvi | |
| 2011/0064275 A1* | 3/2011 | Nagaoka | G06T 7/55 |
| | | | 382/106 |
| 2013/0286205 A1* | 10/2013 | Okada | G06K 9/00805 |
| | | | 348/148 |
| 2014/0119597 A1* | 5/2014 | Sung | G06K 9/00805 |
| | | | 382/103 |

(Continued)

OTHER PUBLICATIONS

Toshev et al., "Shape-based Object Recognition in Videos Using 3D Synthetic Object Models," 2009 IEEE Conference on Computer Vision and Pattern Recognition, 8 pages (2009).

*Primary Examiner* — Omar S Ismail
(74) *Attorney, Agent, or Firm* — Christopher G. Darrow; Darrow Mustafa PC

(57) ABSTRACT

In one embodiment, a system for determining the direction of objects in an image is provided. An image is received from a camera associated with a vehicle. The image is processed to identify an object, such as another vehicle. To determine the direction the object is traveling, the image is provided as input to a machine learning algorithm that outputs a direction of the detected object based at least in part on a training dataset including a plurality of images annotated to include respective direction information determined based at least in part on a plurality of 3D models set to aligned orientations that are significantly aligned with orientations of objects captured in the plurality of images. The objects and their associated directions can be provided to one or more autonomous vehicle functions, such as hazard detection or navigation.

20 Claims, 5 Drawing Sheets

(56) References Cited

U.S. PATENT DOCUMENTS

| | | | |
|---|---|---|---|
| 2014/0285523 A1 | 9/2014 | Gruenler et al. | |
| 2014/0362195 A1 | 12/2014 | Ng-Thow-Hing et al. | |
| 2015/0350510 A1* | 12/2015 | Han | H04N 5/2353 |
| | | | 348/229.1 |
| 2016/0086041 A1* | 3/2016 | Stein | G06K 9/00805 |
| | | | 348/148 |
| 2016/0342850 A1* | 11/2016 | Elimalech | G06K 9/00798 |
| 2017/0036673 A1* | 2/2017 | Lee | B60W 30/09 |
| 2017/0103269 A1* | 4/2017 | Heisele | G06T 7/70 |
| 2017/0262728 A1* | 9/2017 | Kozuka | G06T 11/60 |
| 2017/0285649 A1* | 10/2017 | Debreczeni | G08G 1/16 |
| 2018/0025473 A1* | 1/2018 | Contreras | G05D 1/0061 |
| | | | 348/144 |
| 2018/0075309 A1* | 3/2018 | Sathyanarayana | G05D 1/0055 |
| 2018/0232583 A1* | 8/2018 | Wang | G06K 9/628 |
| 2018/0232947 A1* | 8/2018 | Nehmadi | G01S 17/931 |
| 2018/0288320 A1* | 10/2018 | Melick | G01S 17/86 |
| 2018/0307921 A1* | 10/2018 | Vallespi-Gonzalez | |
| | | | G01S 17/89 |
| 2019/0019335 A1* | 1/2019 | Elangovan | G06T 7/70 |
| 2019/0065866 A1* | 2/2019 | Liu | B60W 40/072 |
| 2019/0318492 A1* | 10/2019 | Kim | G06T 7/536 |
| 2019/0371052 A1* | 12/2019 | Kehl | G06K 9/6256 |

\* cited by examiner

SYSTEMS AND METHODS FOR DETERMINING THE DIRECTION OF AN OBJECT IN AN IMAGE

TECHNICAL FIELD

The subject matter described herein relates, in general, to systems and methods for determining the direction of an object in an image, and, in particular, to determining the direction of an object in an image using 3D models.

BACKGROUND

For autonomous driving functions, determining the relative direction of an object, such as another vehicle, in an image is very useful. For example, the direction of an object in an image may be used by machine learning algorithms to perform tasks such as hazard detection and vehicle navigation. However, determining the relative direction in a single image can be difficult.

SUMMARY

An image is received from a camera associated with an autonomous vehicle. The image is processed to identify an object, such as another vehicle. To determine the direction that the object is traveling, the system provides the image as input to a machine learning algorithm that outputs a direction of the detected object based at least in part on a training dataset including a plurality of images annotated to include respective direction information determined based at least in part on a plurality of 3D models set to aligned orientations that are significantly aligned with orientations of objects captured in the plurality of images. The objects and their associated directions can be provided to one or more autonomous vehicle functions such as hazard detection or navigation.

As will be described further below, the system described herein solves many problems described above with respect to determining the direction of objects in images.

In an embodiment, a system for determining the direction of an object in an image is provided. The system includes: one or more processors; and a memory communicably coupled to the one or more processors. The memory stores: a detection module including instructions that when executed by the one or more processors cause the one or more processors to: receive an image from a camera associated with a vehicle; and detect an object in the image. The memory further stores: a direction module including instructions that when executed by the one or more processors cause the one or more processors to: provide the image as input to a machine learning algorithm that outputs a direction of the detected object based at least in part on a training dataset including a plurality of images annotated to include respective direction information determined based at least in part on a plurality of 3D models set to aligned orientations that are significantly aligned with orientations of objects captured in the plurality of images.

In an embodiment, a method for determining the direction of objects in images is provided. The method includes: receiving an image from a camera associated with a vehicle; detecting an object in the image; and providing the image as input to a machine learning algorithm that outputs a direction of the detected object based at least in part on a training dataset including a plurality of images annotated to include respective direction information determined based at least in part on a plurality of 3D models set to aligned orientations that are significantly aligned with orientations of objects captured in the plurality of images.

In an embodiment, a non-transitory computer-readable medium for determining the direction of objects in images is provided. The medium including instructions that when executed by one or more processors cause the one or more processors to: receive an image from a camera associated with a vehicle; detect an object in the image; provide the image as input to a machine learning algorithm that outputs a direction of the detected object based at least in part on a training dataset including a plurality of images annotated to include respective direction information determined based at least in part on a plurality of 3D models set to aligned orientations that are significantly aligned with orientations of objects captured in the plurality of images.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems and methods disclosed herein relate to training a system to determine a direction of an object in an image. Conventional computer vision systems may detect an object in a two-dimensional (2D) image and perform semantic labeling of an object (e.g., car, bicycle, etc.). However, conventional computer vision systems that detect 2D views of objects cannot perform three-dimensional (3D) reasoning. Three-dimensional reasoning refers to determining 3D inferences based on the image, such as, for example, determining a direction of travel of a vehicle. Three-dimensional reasoning may be performed in conventional vision systems based on multi-view imaging, where the same object is captured in images having multiple viewpoints. In many situations that require a quick decision, e.g. driving scenarios of an autonomous vehicle, multiple viewpoint images are not available.

Therefore, systems and methods disclosed herein provide a novel technique for producing a reference or training dataset for a vehicle or machine learning algorithm. In one or more embodiments, the machine learning algorithm may include one or more deep neural networks. The machine learning algorithm employed by the vehicle, including deep neural network(s), may be configured to discern a direction of movement for particular object detected in a 2D image based at least in part on a training dataset. In the disclosed embodiments the training/reference dataset is created by aligning a 3D model with an object in a 2D image and associating a direction with the 3D model. The alignment process is repeated across a set of varying 2D images, resulting in a training dataset or reference dataset.

Figure 1:
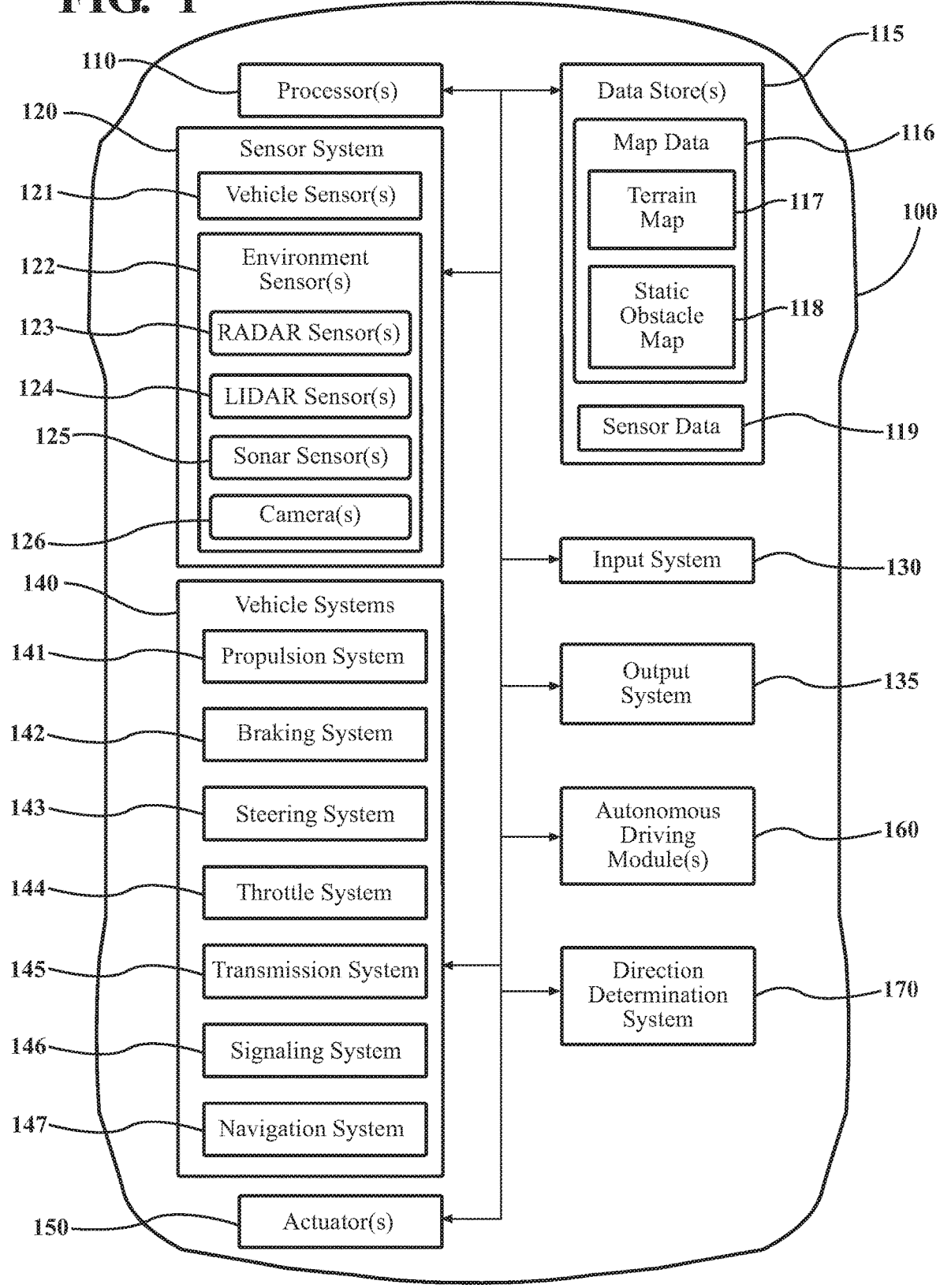
FIG. 1 illustrates one embodiment of a vehicle within which systems and methods disclosed herein may be implemented.

FIG. 1 shows a vehicle 100 that can execute a machine learning algorithm trained according to the disclosed embodiments. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes the direction determination system 170 that is implemented to determine the direction of an object detected in an image. The noted functions and methods will become more apparent with a further discussion of the figures.

Figure 2:
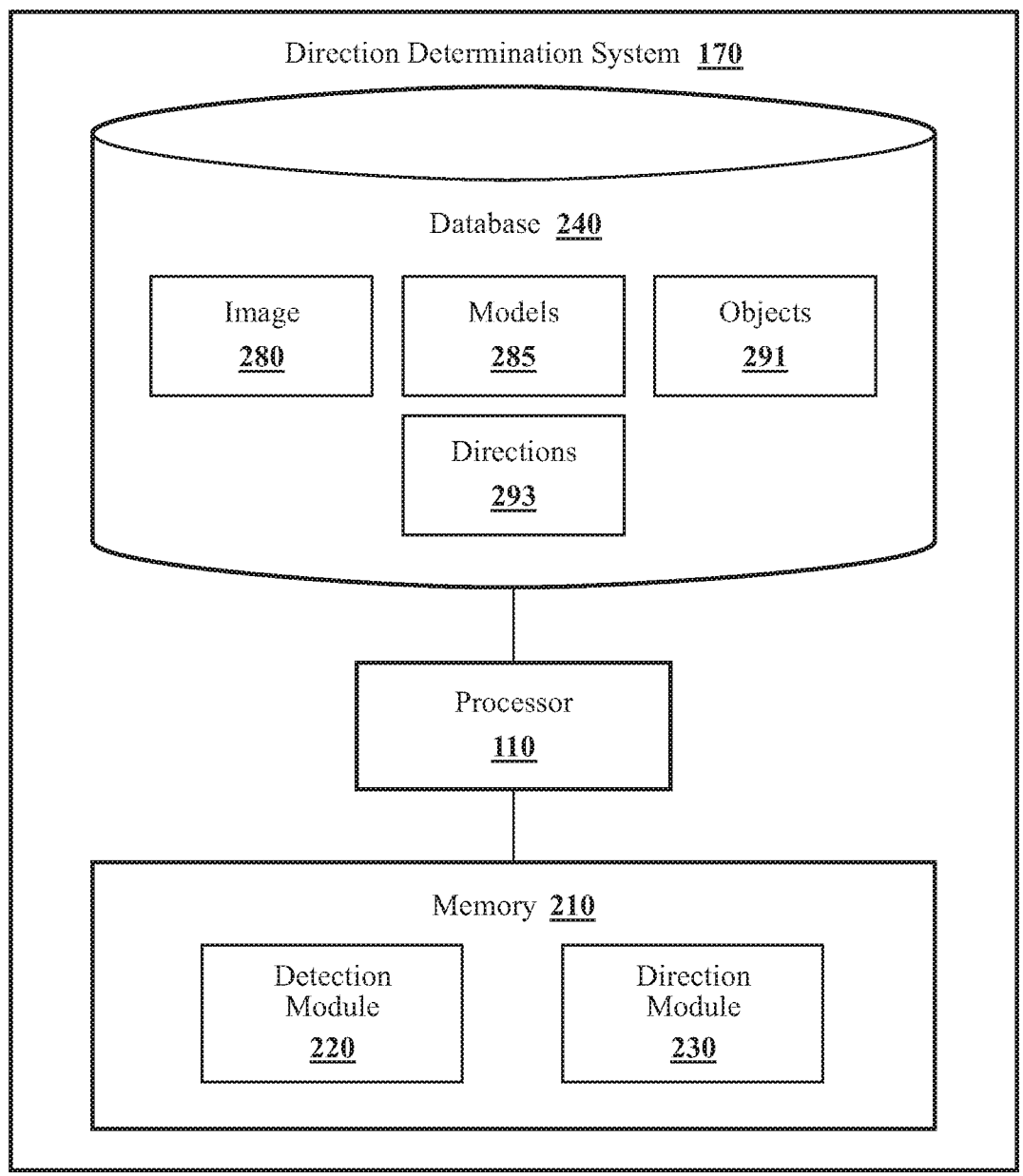
FIG. 2 illustrates one embodiment of a point reduction system.

With reference to FIG. 2, one embodiment of the direction determination system 170 of FIG. 1 is further illustrated. The direction determination system 170 is shown as including a processor 110 from the vehicle 100 of FIG. 1. Accordingly, the processor 110 may be a part of the direction determination system 170, the direction determination system 170 may include a processor separate from the processor 110 of the vehicle 100, or the direction determination system 170 may access the processor 110 through a data bus or another communication path. It should be appreciated, that while the direction determination system 170 is illustrated as being a single contained system, in various embodiments, the direction determination system 170 is a distributed system that is comprised of components that can be provided as a centralized server, a cloud-based service, and so on.

In one embodiment, the direction determination system 170 includes a memory 210 that stores a detection module 220 and a direction module 230. The memory 210 is a random-access memory (RAM), read-only memory (ROM), a hard-disk drive, a flash memory, or other suitable memory for storing the module 220 and the module 230. The modules 220 and 230 are, for example, computer-readable instructions that when executed by the processor 110 cause the processor 110 to perform the various functions disclosed herein. Moreover, as previously noted, in various embodiments, one or more aspects of the direction determination system 170 are implemented as cloud-based services, and so on. Thus, one or more modules of the direction determination system 170 may be located remotely from other components and may be implemented in a distributed manner.

Furthermore, in one embodiment, the direction determination system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes an image 280 and a training dataset 285 along with, for example, other information that is used and/or generated by the modules 220 and 230 such as objects 291 and directions 293. Of course, in further embodiments, the various information may be stored within the memory 210 or another suitable location.

The detection module 220 is configured to receive an image 280 and detect one or more objects 291 in the image 280. The image 280 may be received from a sensor associated with the vehicle 100 such as a camera 126. The image 280 may include a plurality of pixels in a given resolution. Each pixel may be associated with coordinates (e.g., an x-coordinate and a y-coordinate) in a reference frame used by the image 280.

The detection module 220 may detect the one or more objects 291 in the image 280 using one or more computer vision algorithms trained to identify objects 291 in images 280. Depending on the embodiment, the objects 291 may include a variety of objects 291 such as other vehicles. Any type of computer vision algorithm may be used.

Figure 3:
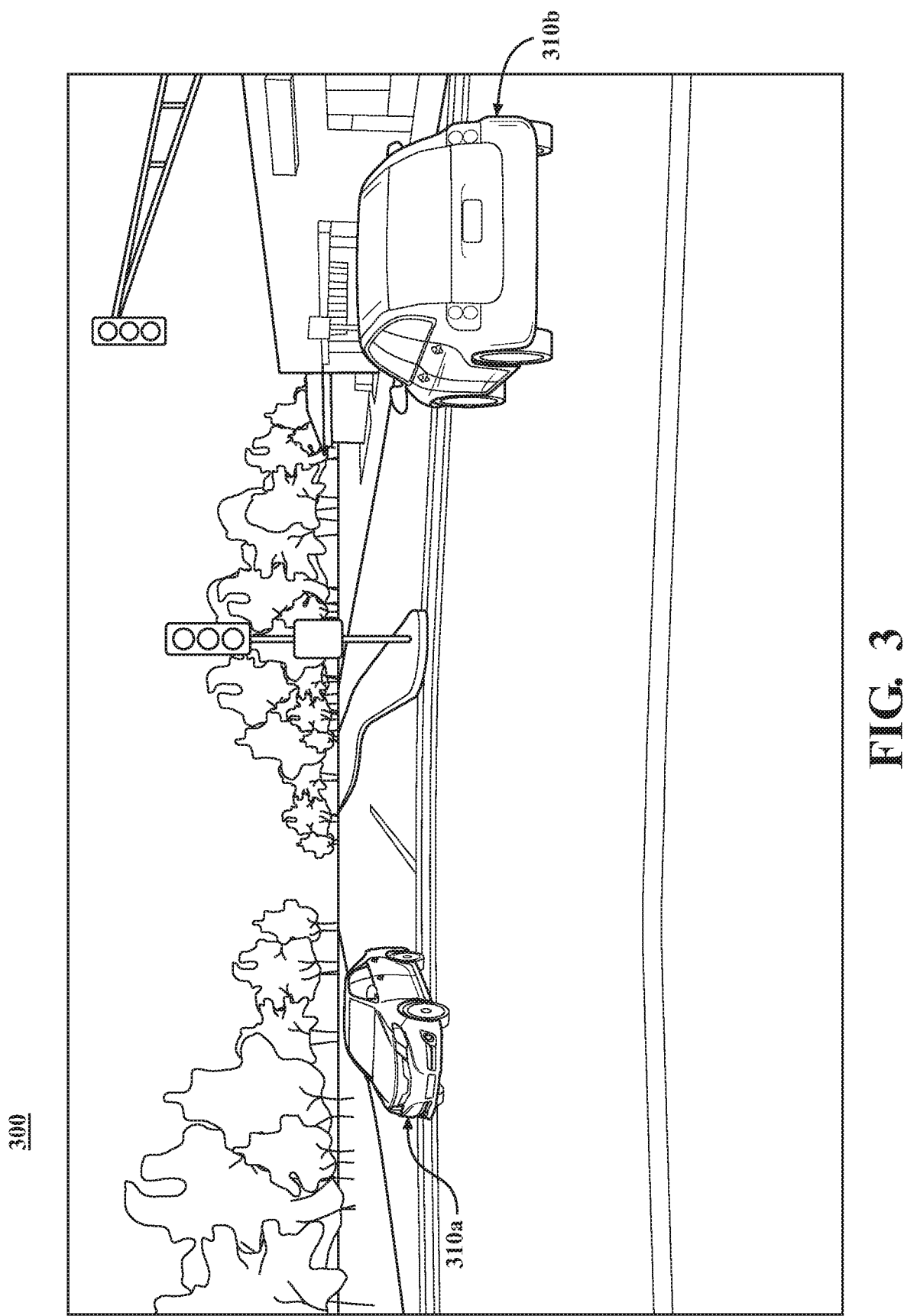
FIGS. 3-4 illustrate example images.

For example, FIG. 3 is an illustration of an example image 300 taken by a camera 126 of a vehicle 100. As shown, the detection module 220 has detected two objects 291 in the image 300. The objects 291 are vehicles and are labeled in the image 300 as the vehicles 310a and 310b.

Returning to FIG. 2, the direction module 230 may, for each object 291 detected in the image 280, determine the direction 293 that the object 291 is traveling in by processing the image with a machine learning algorithm configured to receive an image as input and output a direction for detected objects based on a training dataset according to the disclosed embodiments. The direction module 230 may store one or more sets of instructions of the machine learning algorithm. In addition, the direction module 220 may estimate the distance from each object 291 to the vehicle 100 that captured the image 280.

In one implementation the machine learning algorithm can be implemented as a deep neural network. However, the disclosed training data can be used with other types of machine learning techniques.

The training dataset 285 includes a plurality of images that include objects captured while moving in various directions. The images are annotated with information indicating the direction of movement of objects in the images. To determine the direction for a given image including an object, a model is selected to correspond to the object or, in a case when multiple objects are present, multiple models can be selected. As will be described further below, a model can include generic characteristics and be selected based on matching one or more characteristics of the object in the image. In one or more embodiments a human operator can adjust the model orientation into a direction that aligns the model with the object. While a human operator can achieve the high level of precision required for use in autonomous vehicle systems, in one or more embodiments a secondary machine learning algorithm can automatically adjust the model orientation into a direction that aligns the model with the object. For example, for some types of images the accuracy of a secondary machine learning algorithm adjustment may be sufficient, thereby allowing utilization of the increased production rate of automation to increase the size of the training dataset in reduced time.

Figure 4:
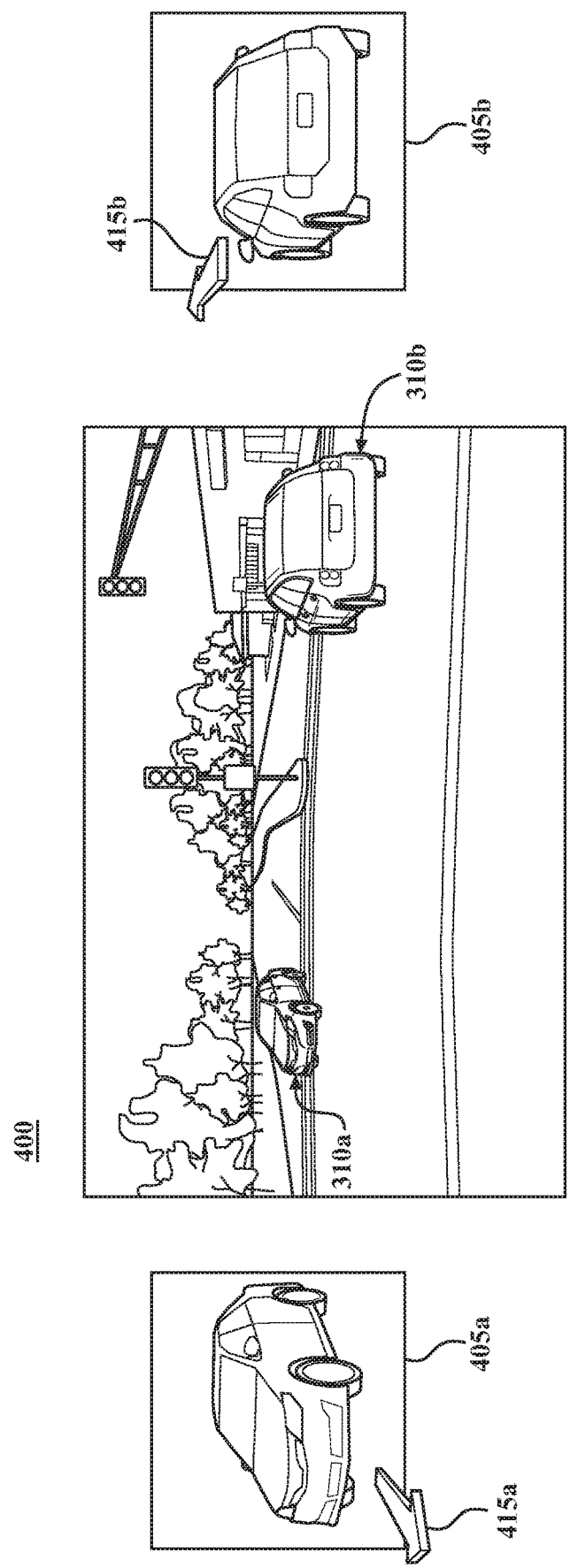

For example, FIG. 4 is an illustration of an image 400. For simplicity, the image 400 may be the same as the image 300 described with respect to FIG. 3. In the image 400, two objects (i.e., the objects 310a and 310b) are present. A human operator (or secondary machine learning algorithm) can select and adjust models based on the detected objects. In the example shown, the model 405a has been selected for the object 310a and the model 405b has been selected for the object 310b. As shown, each model has been placed near its corresponding object in the image 400.

The orientation of each model has been adjusted such that it appears similar to the orientation of its corresponding object. For example, the model 405a is oriented such that it appears to be heading towards the camera and the model 405b is oriented such that it appears to be heading away from the camera.

As shown, each model is associated with a direction, illustrated as an arrow, relative to the camera. After the model 405a has been selected and oriented based on the object 310a, its direction 415a is pointing towards the left of the camera 126. Similarly, after the model 405b was selected and oriented based on the object 310b, its direction 415b is pointing away from the camera 126. The human operator (or secondary machine learning algorithm) can annotate the image 400 to associate the direction 415a with the object 305a, and associate the direction 415b with the object 305b. For example, in one or more embodiments an angle of the directions relative to a position (e.g., the camera position or a vanishing point position) can be calculated and the relative angle associated with each object can be annotated to the image.

By repeating this process over a plurality of images, a training dataset 285 can be compiled. Referring to FIG. 3, the direction module 230 can therefore provide the image 300 as input to a machine learning algorithm, e.g., a deep neural network, trained on a training dataset 285. As described above, training dataset 285 includes a plurality of images annotated to include respective direction information based on a plurality of 3D models that are respectively associated with directions corresponding to directions of objects in the plurality of images. The machine learning algorithm can output a direction 293 for the detected object based on characterizations realized from the training.

Returning to FIG. 2, the direction module 230 may further estimate a distance between the vehicle 100 and each object 291 in the image 280. In some implementations, the direction module 230 may estimate a distance between an object 291 and the vehicle 100 based on a bottom-most y-coordinate of the object 291 in the image 280. Generally speaking, the lower an object 291 in an image 280 the closer it may be to the vehicle 100. Other methods for estimating the distance of an object 291 in an image may be used.

The direction module 230 may further annotate the image 280 with the outputted directions 293 and/or the estimated distances. Any method for associating or annotating an image 280 may be used.

The direction module 230 may provide the annotated image 280 for use by one or more vehicle functions. The vehicle functions may include hazard detection and avoidance and navigation, for example. Other vehicle functions may be supported. The direction module 230 may provide the annotated image 280 to one or more autonomous driving modules 160 associated with the vehicle 100.

Figure 5:
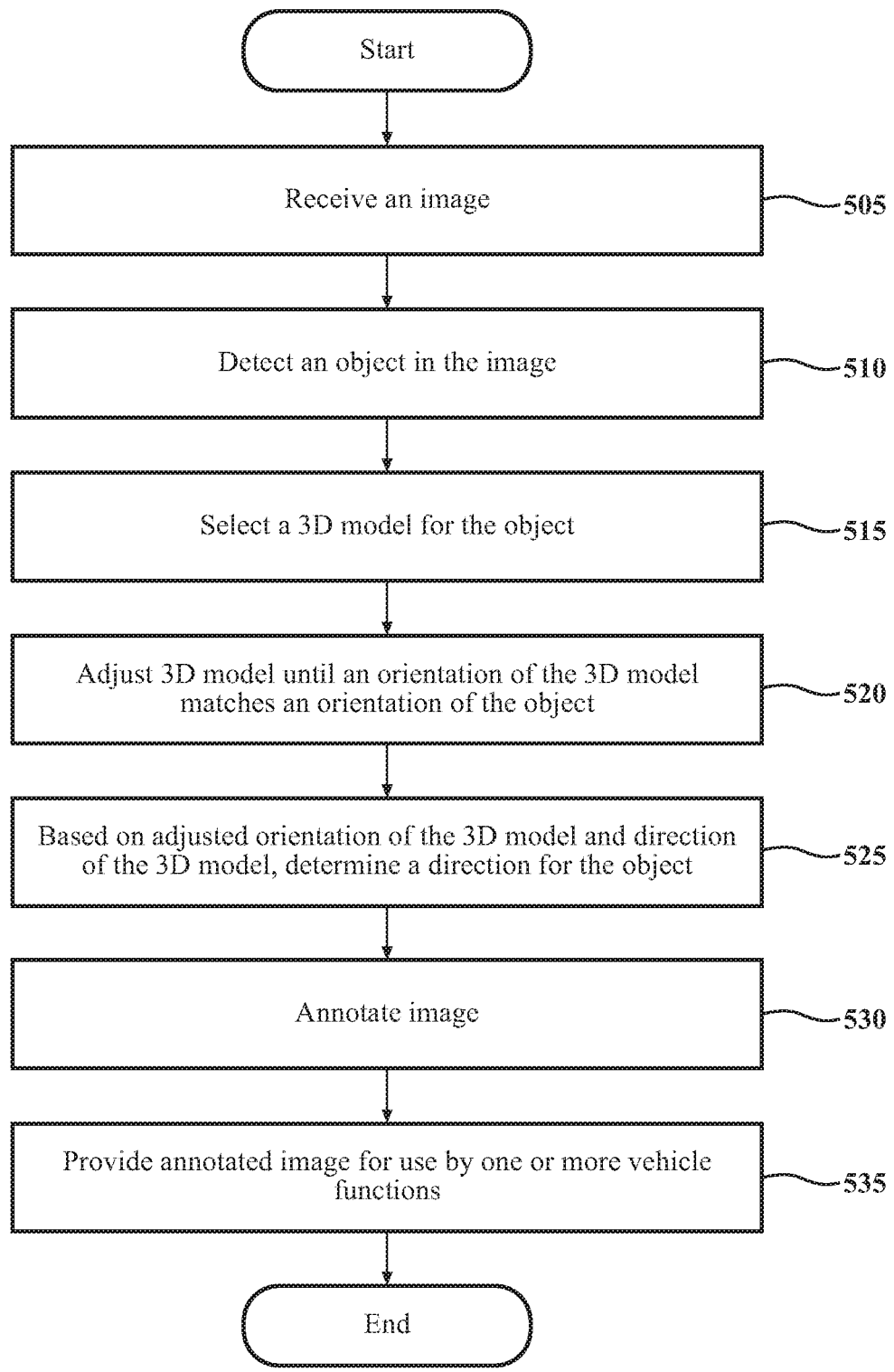
FIG. 5 illustrates a flowchart of a method that is associated with determining the direction on an object in an image.

Additional aspects of image 280 annotation will be discussed in relation to FIG. 5. FIG. 5 illustrates a flowchart of a method 500 that is associated with determining the direction 293 of objects 291 in images 280 using a machine learning algorithm according to the disclosed embodiments. The method 500 will be discussed from the perspective of the direction determination system 170 of FIGS. 1 and 2. While the method 500 is discussed in combination with the direction determination system 170, it should be appreciated that the method 500 is not limited to being implemented within the direction determination system 170 but is instead one example of a system that may implement the method 500.

At 515, for each image in a plurality of images, a human operator or a secondary machine learning algorithm selects a 3D model for an object in an image. The 3D model may be selected based at least in part on one or more similarities with the objects. For example, if the object is a vehicle, a 3D model of a vehicle that is similar in overall shape and size as the object may be selected. The 3D model may further be selected to correspond to a certain type of vehicle. The types may include, for example, small vehicle, large vehicle, truck, small truck, large truck, van, sedan, coup, compact car, etc. The 3D model can have an associated direction.

At 520, the human operator or secondary machine learning algorithm adjusts the 3D model until an orientation of the 3D model matches an orientation of the object in the image. The human operator or secondary machine learning algorithm may adjust the 3D model by placing the 3D model near the object in the image in a digital environment and rotating the 3D model (e.g., in X and Y coordinate directions) until the orientation of the 3D model matches the object orientation.

At operation 525, the human operator or secondary machine learning algorithm annotates the images with direction information associated with the object based on the orientation of the 3D model to create a sample for a training dataset for a machine learning algorithm. For example, in one or more embodiments the direction information can include a relative angle of a line of travel of the object. Operations 505-525 may be applied to a plurality of images, resulting in a training dataset of samples including a plurality of images that are annotated with direction information associated with objects in the images.

At operation 505, the vehicle 100 receives an image. The image 280 may be received from a camera 126 associated with the vehicle 100. The camera 126 may be located on the vehicle 100.

At operation 510 the detection module 220 detects that the image contains an object 291. The detection module 220 may detect an object 291 such as another vehicle. The detection module 220 may detect the object 291 using a computer vision algorithm. Other methods may be used.

At 525, the direction module 230 determines a direction 293 for the object 291. The direction module 230 determines the direction 293 for the object 291 by providing the image as input to a machine learning algorithm configured to output a direction based on the training dataset.

At 530, the direction module 230 may annotate the image 280. The direction module 230 may annotate the image 280 to identify the detected object 291 and the determined direction 293. Any method for annotating an image 280 may be used.

At 535, the direction module 230 may provide the annotated image 280 for use by one or more vehicle functions.

The one or more vehicle functions may include hazard detection and navigation, for example. Other vehicle functions may be used.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LiDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the direction determination system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the direction determination system 170, and/or the autonomous driving module(s) 160 may control some or all of these vehicle systems 140 and, thus, may be partially or fully autonomous.

The processor(s) 110, the direction determination system 170, and/or the autonomous driving module(s) 160 can be operatively connected to communicate with the various vehicle systems 140 and/or individual components thereof. For example, returning to FIG. 1, the processor(s) 110, the direction determination system 170, and/or the autonomous driving module(s) 160 can be in communication to send and/or receive information from the various vehicle systems 140 to control the movement, speed, maneuvering, heading, direction, etc. of the vehicle 100. The processor(s) 110, the direction determination system 170, and/or the autonomous driving module(s) 160 may control some or all of these vehicle systems 140.

The processor(s) 110, the direction determination system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the direction determination system 170, and/or the autonomous driving module(s) 160 can control the direction and/or speed of the vehicle 100. The processor(s) 110, the direction determination system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the direction determination system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for determining a direction of an object in an image, comprising:
one or more processors; and
a memory communicably coupled to the one or more processors and storing:
a detection module including instructions that when executed by the one or more processors cause the one or more processors to:
receive the image from a camera associated with a vehicle; and
detect the object in the image; and
a direction module including instructions that when executed by the one or more processors cause the one or more processors to:
provide the image as input to a machine learning algorithm that outputs the direction of the object based at least in part on a training dataset including a plurality of images annotated to include respective direction information determined based at least in part on a plurality of 3D models set to aligned orientations that are significantly aligned with orientations of objects captured in the plurality of images.

2. The system of claim 1, wherein at least one 3D model of the plurality of 3D models is set to an aligned orientation by a human operator adjusting a current orientation of the at least one 3D model to match an existing orientation of an object captured in at least one image of the plurality of images.

3. The system of claim 2, wherein the at least one 3D model is selected to correspond with at least one object in the at least one image of the plurality of images based at least in part by:
determining a size of the at least one object and a shape of the at least one object; and
selecting the at least one 3D model based on the size and the shape.

4. The system of claim 2, wherein the at least one 3D model is selected to correspond with at least one object in at least one image of the plurality of images based at least in part by:
determining a type of the at least one object; and
selecting the at least one 3D model based on the type.

5. The system of claim 1, wherein the object is another vehicle.

6. The system of claim 1, wherein the vehicle is an autonomous vehicle.

7. The system of claim 1, wherein the direction module further includes instructions to annotate the image to include the direction for the object in the image.

8. The system of claim 7, wherein the direction module further includes instructions to provide the image, with annotations, for use by one or more vehicle functions.

9. The system of claim 8, wherein the vehicle functions include hazard detection and navigation.

10. A method for determining a direction of an object in an image, comprising:
receiving the image from a camera associated with a vehicle;
detecting the object in the image; and
providing the image as input to a machine learning algorithm that outputs the direction of the object based at least in part on a training dataset including a plurality of images annotated to include respective direction information determined based at least in part on a plurality of 3D models set to aligned orientations that are significantly aligned with orientations of objects captured in the plurality of images.

11. The method of claim 10, further comprising setting at least one 3D model of the plurality of 3D models to an aligned orientation by adjusting a current orientation of the at least one 3D model to match an existing orientation of an object captured in at least one image of the plurality of images.

12. The method of claim 11, further comprising selecting the at least one 3D model of the plurality of 3D models to correspond with at least one object in at least one image of the plurality of images by:
   determining a size of the at least one object and a shape of the at least one object; and
   selecting the at least one 3D model based on the size and the shape.

13. The method of claim 11, further comprising selecting the at least one 3D model of the plurality of 3D models to correspond with at least one object in at least one image of the plurality of images by:
   determining a type of the at least one object; and
   selecting the at least one 3D model based on the type.

14. The method of claim 10, wherein the object is another vehicle.

15. The method of claim 10, wherein the vehicle is an autonomous vehicle.

16. The method of claim 10, further comprising annotating the image to include the direction for the object in the image.

17. The method of claim 14, further comprising providing the image, with annotations, for use by one or more vehicle functions.

18. The method of claim 15, wherein the vehicle functions include hazard detection and navigation.

19. A non-transitory computer-readable medium for determining directions of objects in images and including instructions that when executed by one or more processors cause the one or more processors to:
   receive an image from a camera associated with a vehicle;
   detect an object in the image; and
   provide the image as input to a machine learning algorithm that outputs a direction of the object based at least in part on a training dataset including a plurality of images annotated to include respective direction information determined based at least in part on a plurality of 3D models set to aligned orientations that are significantly aligned with orientations of objects captured in the plurality of images.

20. The non-transitory computer-readable medium of claim 19, wherein at least one 3D model of the plurality of 3D models is set to an aligned orientation by a human operator adjusting a current orientation of the at least one 3D model to match an existing orientation of an object captured in at least one image of the plurality of images.

* * * * *